Aug. 11, 1936.  K. C. RANDALL  2,050,378
SWITCHBOARD
Filed March 23, 1935  2 Sheets-Sheet 1
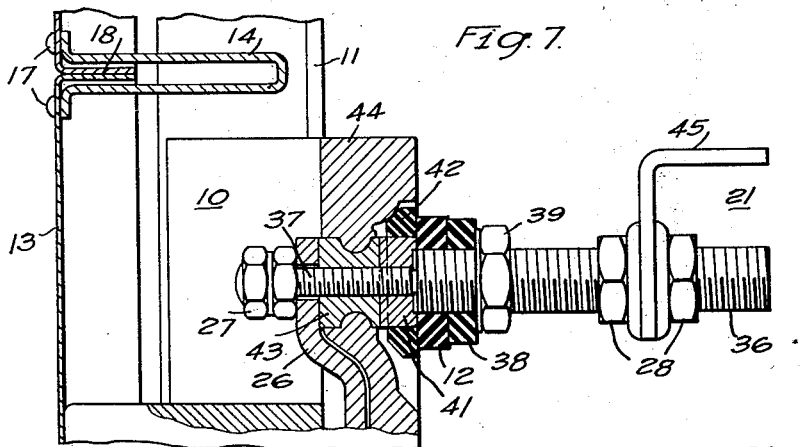
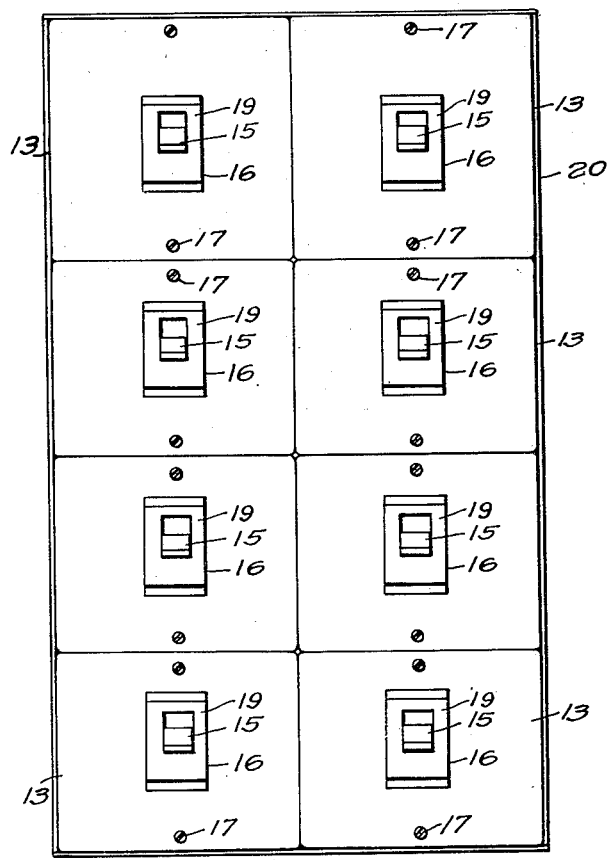
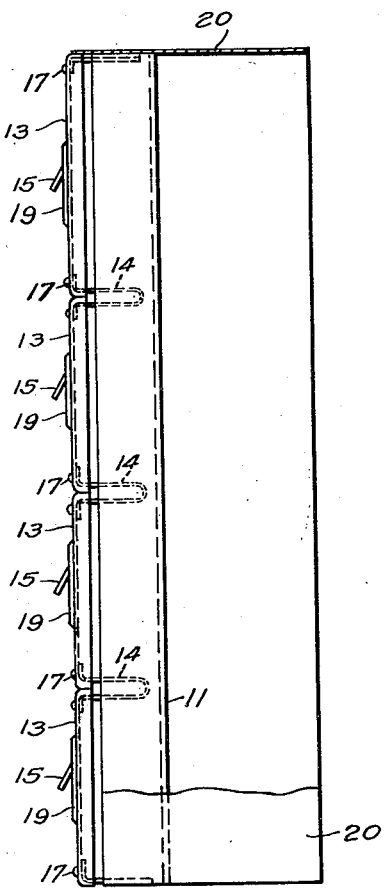
WITNESSES:
E. A. McCloskey
INVENTOR
Karl C. Randall.
ATTORNEY Aug. 11, 1936.  K. C. RANDALL  2,050,378
SWITCHBOARD
Filed March 23, 1935   2 Sheets—Sheet 2
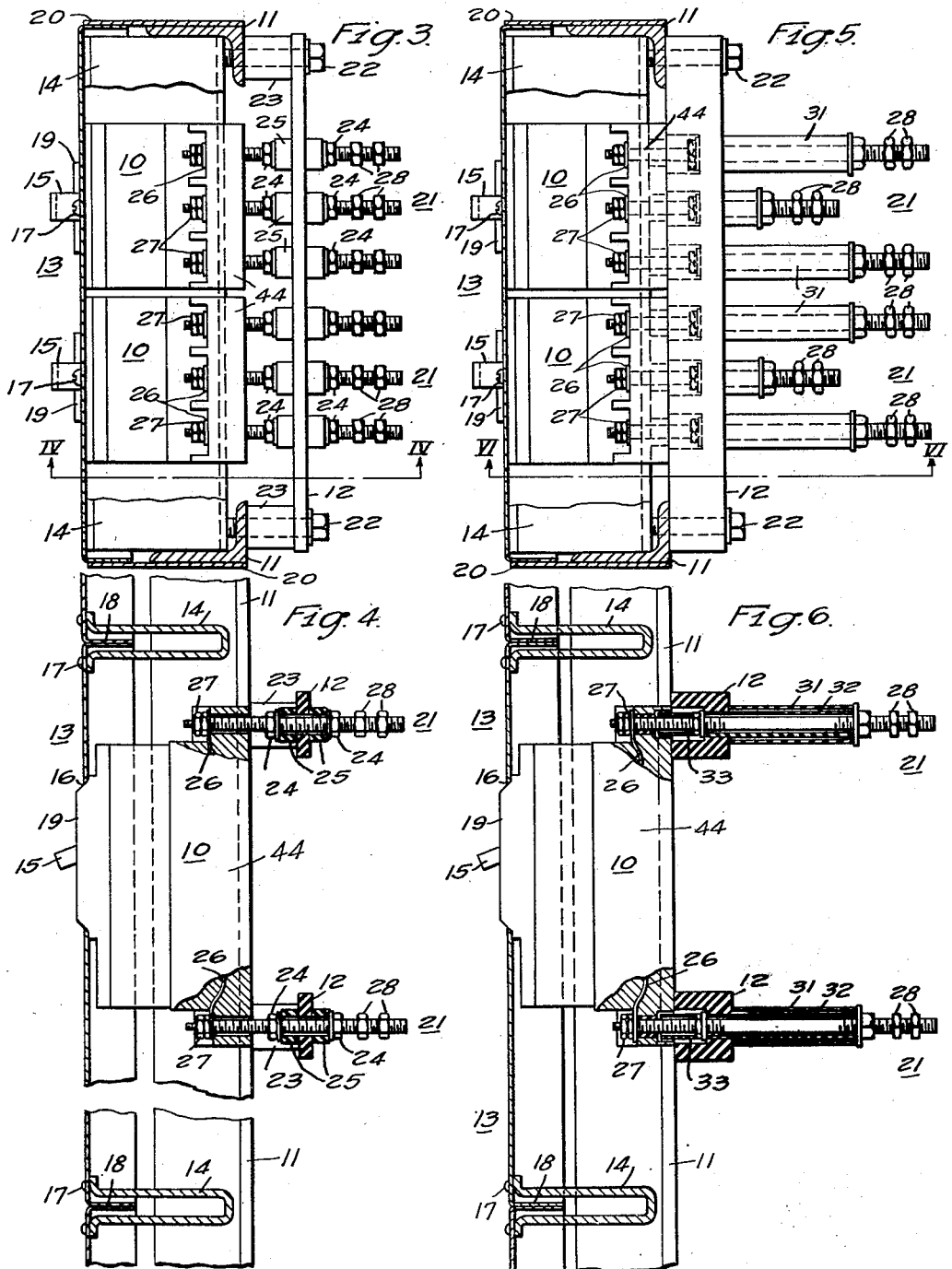
WITNESSES:
INVENTOR
Karl C. Randall.
BY
ATTORNEY Patented Aug. 11, 1936

2,050,378

UNITED STATES PATENT OFFICE 2,050,378

SWITCHBOARD

Karl C. Randall, Edgewood, Pa., assignor to Westinghouse Electric & Manufacturing Company, East Pittsburgh, Pa., a corporation of Pennsylvania Application March 23, 1935, Serial No. 12,751

8 Claims. (Cl. 175—371)

My invention relates, generally, to switchboards and more particularly to switchboard structures for supporting automatic circuit breakers and similar switching apparatus.

In the interest of safety it is desirable to provide switchboards of the dead-front type in which all parts of the switching apparatus and conductors which carry current are mounted at the rear of the switchboard panels with only the operating handles of the switching apparatus exposed at the front of the panels. However, in order that the switching apparatus may be readily and safely inspected and repaired, it is desirable that the apparatus be both accessible and removable from in front of the switchboard panels to avoid personal contact with the energized conductors at the rear of the panel.

An object of my invention, generally stated, is to provide a dead-front switchboard structure which shall be simple and efficient in operation and which may be economically manufactured and installed.

A more specific object of my invention is to provide for readily removing switching apparatus from in front of a switchboard structure of the dead-front type.

Another object of my invention is to provide combined terminal and mounting means for removably supporting enclosed switching apparatus in a dead-front switchboard structure.

Other objects of my invention will be either explained fully hereinafter or will be apparent to those skilled in the art.

In accordance with one embodiment of my invention, an enclosed circuit breaker unit is so mounted on a switchboard structure of the dead-front type that the breaker unit may be readily removed from in front of the switchboard structure without removing or coming in contact with the current carrying conductors at the rear of the structure. The breaker unit is supported by fixed studs which also serve as terminal connectors for making the necessary electrical connections to the circuit breaker. A removable switchboard panel is mounted in front of the breaker unit and provided with an opening for the operating handle of the breaker. The panel may be readily removed to permit the breaker to be disconnected from its supporting studs and removed from the switchboard structure.

For a fuller understanding of the nature and objects of my invention, reference may be had to the following detailed description, taken in conjunction with the accompanying drawings, in which:

Figure 1 is a view, in front elevation, of a switchboard structure suitable for mounting switch units, or circuit breakers, in accordance with my invention;

Fig. 2 is a view, in side elevation, of the switchboard structure shown in Fig. 1;

Fig. 3 is a view, partially in plan and partially in section of a switchboard structure showing automatic circuit breakers mounted in accordance with my invention;

Fig. 4 is a view, in vertical section, taken along the lines IV—IV of Fig. 3;

Figs. 5 and 6 are views, similar to Figs. 3 and 4, respectively, showing a modification of the invention; and Fig. 7 is an enlarged view, in section, of a modified form of mounting stud for the circuit breakers.

Referring now to the drawings, and particularly to Figs. 3 and 4, the structure shown comprises two enclosed switch units 10, a pair of upright frame members 11, which may be angle-iron bars or other suitable support members, a pair of insulating cross members 12 for supporting the switch units 10, and a switchboard panel 13, composed of sheet steel or other suitable material, which is supported by a pair of U-shaped members 14, which are welded to the upright members 11 or secured thereto in any other suitable manner.

The switch units 10 are preferably automatic circuit breakers of the type fully described in the copending applications of H. J. Lingal, Serial Nos. 600,624 and 637,749, filed March 23, 1932, and October 14, 1932, respectively, and assigned to the Westinghouse Electric & Manufacturing Company, although any suitable switch unit may be readily utilized. The circuit breakers shown are each provided with an operating handle 15 which extends through an opening 16 in the panel 13.

The panel 13 is removably attached at its top and bottom to one leg of each of the U-shaped members 14 by screws 17. The members 14 are horizontally disposed between the angle-iron supports 11, the ends of the members 14 being welded to the angle bars 11. The panel 13 is provided with inwardly-turned flanges 18 which are disposed between the legs of the U-shaped members 14.

As shown, the switchboard structure may comprise several panel sections 13, disposed one above the other with their flanges 18 abutting, in which case each of the members 14 serves as a support for the panels 13 and also prevents light from shining through the joint between the panel members, thereby improving the general appearance of the switchboard structure. If desired, the openings 16 in the panels may be made sufficiently large to expose a raised portion 19 of the housing of the circuit breaker units.

As illustrated in Fig. 1, one panel section 13 may be provided for each breaker unit 10 instead of providing only one panel for two or more breaker units. The structure shown in Fig. 1 is preferable when larger sized breakers are utilized. It will be seen that the structure may be readily expanded to accommodate any desired number of breaker units by increasing the number of panels, which may be disposed in vertical and horizontal alinement, thereby making a neat and attractive switchboard structure. A sheet metal casing 20 may be provided at the rear of the structure, thereby making a totally enclosed structure.

In order that the breaker units may be individually removed from in front of the supporting structure, each breaker is independently supported by stud members 21, which are mounted in the insulating cross members 12. The cross members 12 are secured to the upright bars 11 by bolts 22, spacing sleeves 23 being provided between the angle bars 11 and the cross members 12. The studs 21 also function as terminal members for making electrical connections to the circuit breakers. Since the breakers shown are of the three-pole type, three studs are provided at the top and the bottom of each breaker.

Referring to Figs. 3 and 4, it will be seen that each one of the studs 21 is secured in the mounting strap 12 by a pair of nuts 24 with insulating spacing washers 25 disposed between the nuts and the strap. The front ends of the stud pass through holes provided in the breaker housing, and terminal straps 26 rest against shoulders on the studs 21 to prevent the face of the breaker housing receding from the panel 13. The breaker is held in position by nuts 27, screwed on the front ends of the studs 21 to engage the terminal straps 26. The proper current carrying conductors may be readily connected to the rear ends of the studs 21 by nuts 28.

From the foregoing description, it will be seen that the breaker units may be individually removed from in front of the switchboard structure without removing or loosening the studs 21 from the mounting straps 12 by first removing the panel 13 by taking out the screws 17 and then removing the breaker from the studs 21 by removing the nuts 27. This may be readily done from in front of the switchboard structure, it being unnecessary to disturb or come in contact with any of the electrical connections at the rear of the structure, thereby greatly increasing the safety of the person removing the breaker. After the breaker is removed from the structure, it may be inspected or repaired and then replaced on the studs or another similar unit may be installed, if desired.

The structure shown in Figs. 5 and 6 is similar to that illustrated in Figs. 3 and 4 with the exception of the mounting straps 12, the studs 21 and the insulation for the studs, which is suitable for a higher voltage than the structure shown in Figs. 3 and 4. The front portion of the studs 21 is enclosed by the mounting straps 12 which function as spacing members as well as supporting and insulating members. Also, telescoping insulating sleeves 31 and 32 are provided for the rear portion of each stud 21. An additional insulating sleeve 33 surrounds that portion of each stud 21 which is between the legs of the U-shaped mounting strap 12 and extends into the opening in the circuit breaker housing through which the stud passes in order to provide sufficient insulation when the breakers are utilized in high potential systems. However, the breaker units 10 may be readily removed in the manner described hereinbefore by first removing the panel 13 and then removing the nuts 27 from the studs 21.

The modified form of terminal and mounting stud shown in Fig. 7 is suitable for use with the larger sizes of circuit breakers which carry heavier currents. The complete stud comprises a portion 36 having a relatively large diameter and a portion 37 having a smaller diameter. The larger portion is secured to the mounting strap 12, an insulating washer 38 being provided between the mounting strap 12 and a nut 39 which draws the head 41 of the mounting stud securely against the mounting strap 12. An insulating barrier 42 surrounds the head 41 of the mounting stud. The small portion 37 of the stud is threaded into the head 41, however, the entire stud may be made from one piece of material if desired. The breaker unit 10 is provided with a metal insert 43, disposed in the base 44 of the breaker housing and having an opening through which the stud 37 is inserted to support the breaker. The copper conductor 26, which is connected to a contact member (not shown) of the circuit breaker is drawn tightly against the metal insert 43 by the nuts 27 and the insert 43 is pressed against the head 41 of the mounting stud. In this manner the insert 43 is utilized to help conduct the current which passes through the breaker. A conductor 45 is connected to the mounting stud 36, which also serves as a terminal member for making electrical connections to the circuit breaker. It will be seen that the breaker unit may be readily removed by simply removing the nuts 27, as in the schemes described hereinbefore.

From the foregoing description, it is apparent that I have provided a switchboard structure of the dead-front type wherein the switch units are rigidly mounted on the supporting structure and are readily and safely removable from in front of the structure, it being unnecessary for the operator to remove the supporting studs or come in contact with any connections at the rear of the switchboard structure while removing a switch unit.

Since many modifications may be made in the apparatus and arrangement of parts without departing from the spirit of my invention, I do not wish to be limited other than by the scope of the appended claims.

I claim as my invention:

1. Switchboard structure comprising a pair of upright frame members, insulating cross members removably secured to said upright members, U-shaped members horizontally disposed between the upright members and secured thereto, a switch unit removably mounted on the front of said insulating members, a flanged switchboard panel disposed in front of the switch unit and provided with an opening for the operating handle of the switch unit, the flanges of said panel being disposed between the legs of said U-shaped members, and means for removably securing the panel to said U-shaped members, whereby the switch unit is removable from in front of the switchboard structure.

2. Switchboard structure comprising upright frame members, insulating cross members removably secured to said upright members, U-shaped members horizontally disposed between the upright members and secured thereto, a plurality of switch units removably mounted on the front of said insulating members, a plurality of flanged switchboard panels disposed in front of the switch units and provided with openings for the operating handles of the switch units, the abutting flanges of said panels being disposed between the legs of said U-shaped members, and means for removably securing each of said panels to said U-shaped members, whereby the switch units are individually removable from in front of the switchboard structure.

3. Switchboard structure comprising upright frame members, an insulating cross member on said frame members, a combined mounting and terminal stud secured in said cross member, a switch unit removably mounted on the front end of said stud, an electrical conductor connected to the rear end of said stud, and a removable switchboard panel disposed in front of the switch unit, whereby the switch unit is removable from in front of the switchboard structure without removing the stud from the cross member.

4. Switchboard structure comprising a supporting framework, a combined mounting and terminal stud disposed at the rear of said framework, means for securing the stud in position on the framework, a switch unit removably mounted on the front end of said stud, an electrical conductor connected to the rear end of said stud, and a switchboard panel removably disposed in front of the switch unit, whereby the switch unit is removable from in front of the switchboard structure without removing the stud from the framework.

5. Switchboard structure comprising a supporting framework, a combined mounting and terminal stud disposed at the rear of said framework and insulated therefrom, means for securing the stud in position on the framework, a switch unit removably mounted on the front end of said stud, means for connecting an electrical conductor to the rear end of said stud, and a switchboard panel removably mounted on said framework in front of the switch unit, whereby the switch unit is removable from in front of the switchboard structure without removing the stud from the framework.

6. Switchboard structure comprising an upright framework, an insulating cross member disposed at the rear of said framework, a combined mounting and terminal stud secured in said cross member, a circuit breaker unit removably mounted on the front end of said stud, means for connecting an electrical conductor to the rear end of said stud and a switchboard panel removably mounted on the front of said framework and in front of the circuit breaker unit, whereby the circuit breaker unit is removable from in front of the switchboard structure without removing the electrical conductor from the stud.

7. Switchboard structure comprising an upright framework, an insulating cross member of a U-shape secured to said framework, a combined mounting and terminal stud secured in said cross member, insulating sleeves disposed on said stud, a circuit breaker unit removably mounted on the front end of said stud, means for connecting an electrical conductor to the rear end of the stud, and a switchboard panel removably mounted on said framework in front of the circuit breaker unit, whereby the circuit breaker unit is removable from in front of the switchboard structure without removing the stud from the cross member.

8. Switchboard structure comprising an upright framework, an insulating cross member secured to the framework, a combined mounting and terminal stud secured in said cross member, an enclosed circuit breaker unit, a metal insert member disposed in the base of the circuit breaker housing and provided with an opening for receiving one end of said stud, means for removably securing the circuit breaker on the stud means for connecting an electrical conductor to the other end of the stud, and a switchboard panel removably mounted on said framework in front of the circuit breaker unit, whereby the circuit breaker unit is removable from in front of the switchboard structure without removing the stud from the cross member.

KARL C. RANDALL.